US010239741B2

(12) United States Patent
Masuda et al.

(10) Patent No.: US 10,239,741 B2
(45) Date of Patent: Mar. 26, 2019

(54) SUSPENSION-TYPE STACKER CRANE

(71) Applicant: MURATA MACHINERY, LTD., Kyoto-shi, Kyoto (JP)

(72) Inventors: Junichi Masuda, Inuyama (JP); Akito Tai, Inuyama (JP)

(73) Assignee: MURATA MACHINERY, LTD., Kyoto (JP)

(*) Notice: Subject to any disclaimer, the term of this patent is extended or adjusted under 35 U.S.C. 154(b) by 38 days.

(21) Appl. No.: 15/784,231

(22) Filed: Oct. 16, 2017

(65) Prior Publication Data

US 2018/0111754 A1   Apr. 26, 2018

(30) Foreign Application Priority Data

Oct. 26, 2016   (JP) ................. 2016-209306

(51) Int. Cl.
*B66F 9/07* (2006.01)
*B65G 1/04* (2006.01)
*B66F 9/08* (2006.01)
*B66F 9/12* (2006.01)
*B66F 9/24* (2006.01)
*B66F 9/075* (2006.01)

(52) U.S. Cl.
CPC .............. *B66F 9/07* (2013.01); *B65G 1/0421* (2013.01); *B66F 9/072* (2013.01); *B66F 9/0755* (2013.01); *B66F 9/08* (2013.01); *B66F 9/122* (2013.01); *B66F 9/24* (2013.01); *B65G 2201/0235* (2013.01)

(58) Field of Classification Search
CPC ...... B65G 1/04; B65G 1/0407; B65G 1/0421; B66F 9/07; B66F 9/072
See application file for complete search history.

(56) References Cited

U.S. PATENT DOCUMENTS 3,768,666 A * 10/1973 Pamer ................. B66F 9/07
                                                  187/226
4,375,936 A *  3/1983 Dechantsreiter ........ B66C 1/485
                                                  212/319
7,281,608 B2* 10/2007 Hansl .................. B65G 1/0407
                                                  187/226
8,056,681 B2* 11/2011 Fukuda ..................... B66F 9/08
                                                  187/244

FOREIGN PATENT DOCUMENTS

JP   2007-070086 A    3/2007
JP   2010-235300 A   10/2010

* cited by examiner

*Primary Examiner* — Zachary L Kuhfuss
(74) *Attorney, Agent, or Firm* — Keating & Bennett, LLP

(57) ABSTRACT

A suspension stacker crane includes an upper truck frame, a pair of mast units, a transferring device, and an upper base. The upper truck frame includes driving trucks arranged side by side in a travelling direction, and a bogie structure that couples the driving trucks. Each of the pair of mast units is suspended from the bogie structure, and includes a lifting drive motor and a lifting drive transmission. The pair of mast units is arranged side by side in the travelling direction. The transferring device is driven to be lifted or lowered by the lifting drive motor and the lifting drive transmission. The upper base links the pair of mast units.

3 Claims, 11 Drawing Sheets

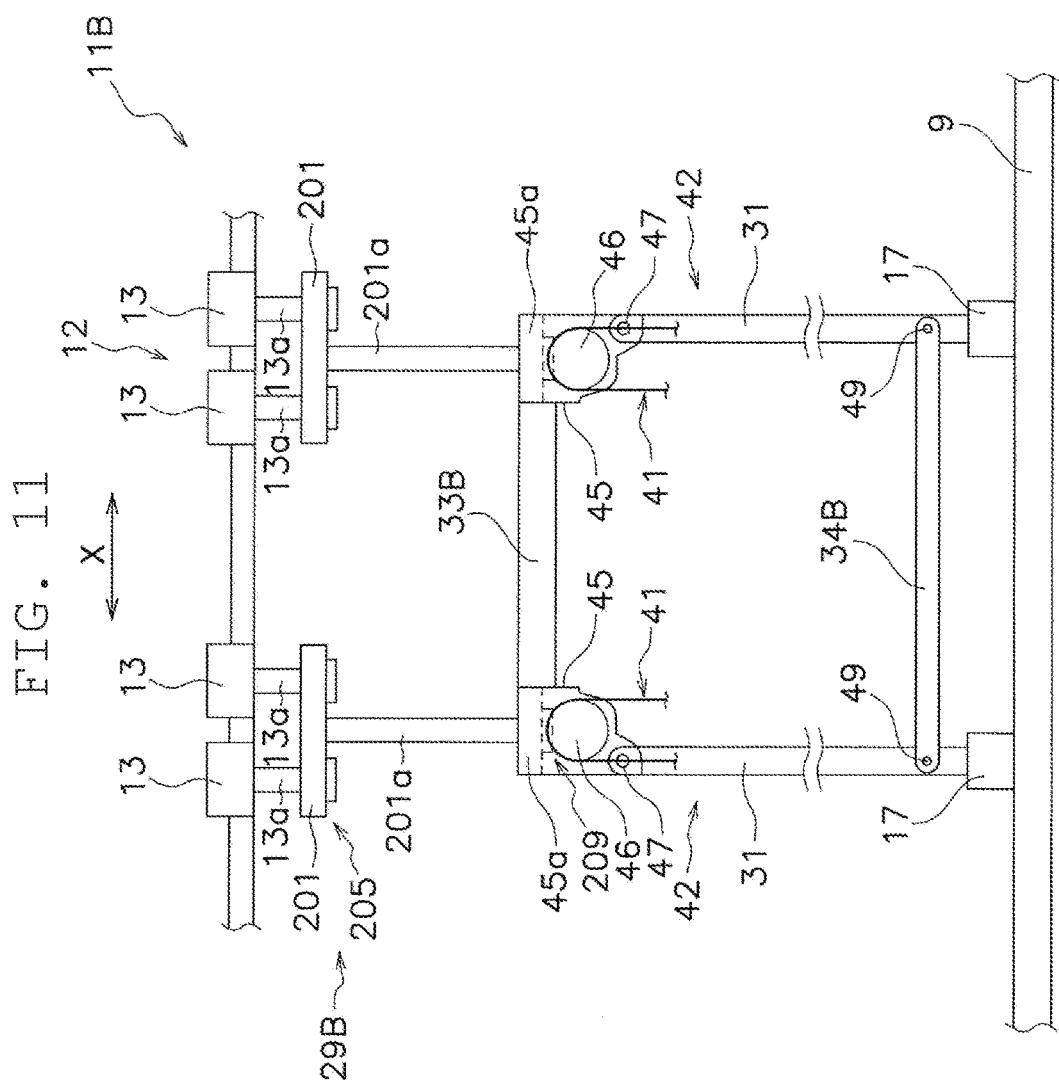

SUSPENSION-TYPE STACKER CRANE

CROSS REFERENCE TO RELATED APPLICATIONS

This application claims the benefit of priority to Japanese Patent Application No. 2016-209306 filed on Oct. 26, 2016. The entire contents of this application are hereby incorporated herein by reference.

BACKGROUND OF THE INVENTION

1. Field of the Invention

The present invention relates to a suspension stacker crane, and particularly relates to a suspension stacker crane including a transferring device movably suspended from driving trucks.

2. Description of the Related Art

A conventional automated storage has a plurality of racks. The racks are arranged in parallel and each include a plurality of shelves arrayed in an extending direction and a vertical direction.

Further, the automated storage has a stacker crane as a transporting device for unloading an article onto the rack shelf or loading an article from the rack shelf. The stacker crane includes a travelling device that travels along a rail, a transferring device, and a lifting device that moves the transferring device in the vertical direction. Part of the rail is disposed laterally side by side with the rack. In a position lateral to the rack, the stacker crane moves the transferring device close to a target shelf, and transfers an article in that state (e.g., see Unexamined Japanese Patent Publication No. 2007-70086).

The travelling device in the stacker crane is made up of a variety of motors, travelling wheels, and the other devices, for example.

Given that some of articles to be transferred are heavy while some are light, it is considered that a stacker crane capable of transferring a heavy article is previously prepared, and that stacker crane transfers a light article as well as a heavy article. Alternatively, it is considered that a travelling device being a different type depending on the kind of article is provided in the stacker crane.

However, in the former case, a large-sized stacker crane is to be used at all times. In the latter case, a different travelling device is to be provided in each stacker crane. In either case, the cost may become high.

SUMMARY OF THE INVENTION

Preferred embodiments of the present invention provide a plurality of types of stacker cranes, which are capable of handling articles with different weights and traveling in an automated storage at low cost.

Hereinafter, a plurality of preferred embodiments of the present invention will be described. Features, elements or characteristics of the preferred embodiments of the present invention can be combined in a freely selected manner as required or desired.

A suspension stacker crane according to a preferred embodiment of the present invention includes a truck frame, a pair of mast units, a transferring device, and a link.

The truck frame includes a plurality of driving trucks arranged side by side in a travelling direction, and a bogie coupler that couples the plurality of driving trucks.

Each of the mast units is suspended from the bogie coupler, and includes a lifting drive motor and a lifting drive transmission. The pair of mast units is arranged side by side in the travelling direction.

The transferring device is driven to be lifted or lowered by the lifting drive motor and the lifting drive transmission.

The link links or connects the pair of mast units.

The "unit" here means a unit which is mounted with required structural elements and is able to be assembled and removed altogether as one integral unit. In this stacker crane, just replacing the link is able to change a span between the pair of mast units in the travelling direction. That is, the replacement is able to change a size of the stacker crane. In this manner, by utilizing a pair of mast units as a common structural element, it is possible to reduce costs even when the configuration of the stacker crane is changed in accordance with an article.

The bogie coupler may include a pair of first bogies that are arranged side by side in front and back positions in the travelling direction, while coupling two driving trucks that are front and rear driving trucks, and a second bogie that couples the pair of first bogies.

A pivotal support structure of the first bogie which pivotally supports the driving trucks may be the same structure as a pivotal support structure of the second bogie which pivotally supports the first bogies.

In this stacker crane, the bogie structure elements have been standardized, to facilitate replacement of the bogie. For example, arranging the driving trucks in the pivotal support structure of the second bogie facilitates increasing and decreasing the number of driving trucks.

One of the mast units may include a mast and a control panel mounted on the mast.

The bogie coupler may include three sets of first bogies that are arranged side by side in front, middle, and back positions in the travelling direction, while coupling two driving trucks arranged side by side in front and back positions in the travelling direction, a second bogie that couples two sets of first bogies out of the three sets of first bogies, and a third bogie that couples the second bogie and the remaining one set of a first bogie out of the three sets of first bogies.

In this stacker crane, by using the bogie coupler, the truck frame may include a total of six driving trucks arrayed in the travelling direction, for example.

Using the stacker cranes according to preferred embodiments of the present invention, a plurality of types of stacker cranes capable of handling articles with different weights are able to travel in an automated storage at low cost.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 11 is a schematic side view showing a schematic configuration of a bogie structure of a third preferred embodiment of the present invention.

DETAILED DESCRIPTION OF THE PREFERRED EMBODIMENTS

First Preferred Embodiment

Figure 1:
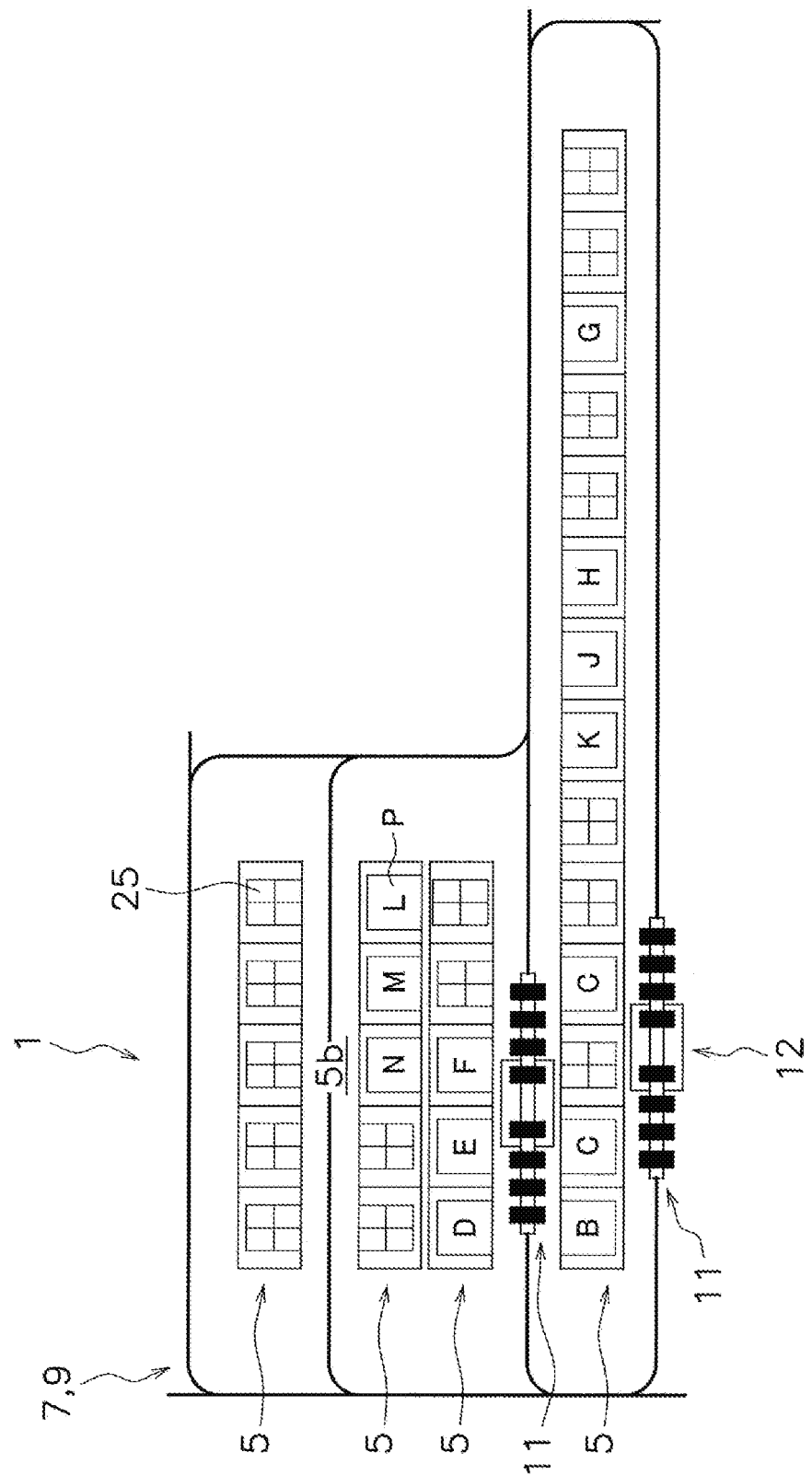
FIG. 1 is a schematic plan view of an automated storage according to a preferred embodiment of the present invention.
Figure 2:
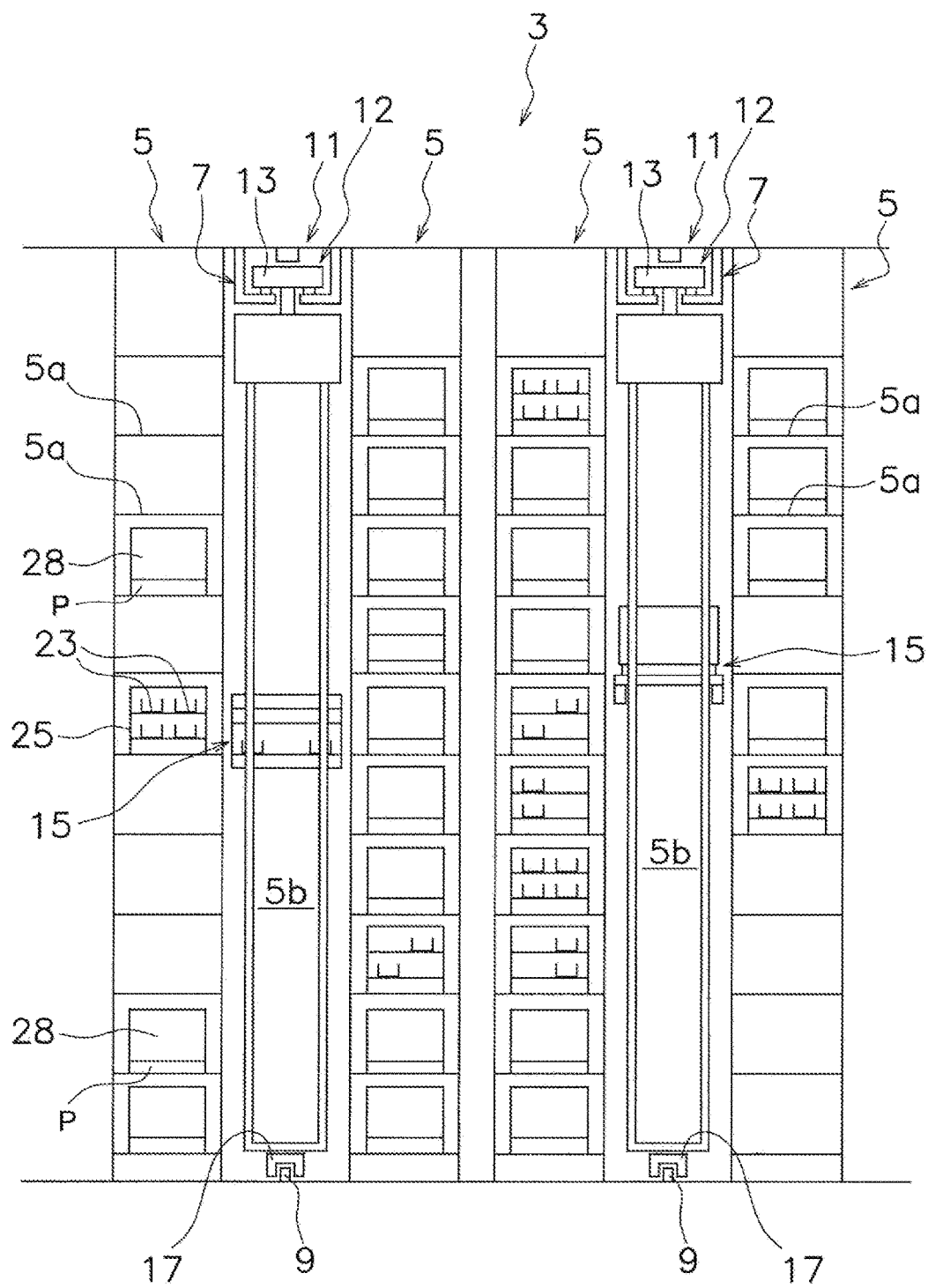
FIG. 2 is a schematic front view of the automated storage.

An automated storage 1 will be described with reference to FIGS. 1 and 2. FIG. 1 is a schematic plan view of an automated storage according to a preferred embodiment of the present invention. FIG. 2 is a schematic front view of the automated storage.

The automated storage 1 includes a plurality of racks 5. Each rack 5 includes a plurality of levels of shelves 5a. In FIG. 1, the plurality of racks 5 are arranged in parallel or substantially in parallel in a laterally extending manner. As shown in FIG. 2, each shelf 5a is able to store a collection shelf or a pallet P (hereinafter may also be referred to as an "article"), for example. On the pallet P, a container 23 or a corrugated cardboard carton 28 is placed, for example.

The collection shelf 25 includes a shelf structure with a plurality of levels of support portions, and is able to store a plurality of containers 23 and corrugated cardboard cartons 28, for example. The container 23 is capable of storing an item. Note that the bottom surface of the collection shelf 25 has a similar structure to that of the bottom surface of the pallet P. This enables support and transport by the stacker crane 11. Further, in FIG. 1, those provided with alphabets are the pallets P stored in the racks 5. In each of the other racks 5, not shown, the container 23 or the corrugated cardboard carton 28 is stored.

The automated storage 1 includes a ceiling rail 7 (an example of a track) provided along the racks 5. Specifically, the ceiling rail 7 is disposed above a path 5b between the racks 5. The ceiling rail 7 is provided at a position higher than the racks 5, namely at a position higher than the plurality of levels of shelves 5a. Further, the ceiling rail 7 includes a plurality of circulating routes with curved portions in a plan layout. The ceiling rail 7 also includes branch portions and merge portions.

The automated storage 1 includes a lower guide rail 9 provided along the racks 5. Specifically, the lower guide rail 9 is disposed on the floor surface of the path 5b between the racks 5.

The automated storage 1 includes a suspension stacker crane 11 (hereinafter referred to as a "stacker crane 11"). "Suspension" or "suspension-type" means that an upper structure performs travelling and branching, and that the upper structure suspends a lower structure. As shown in FIG. 2, the stacker crane 11 travels in the state of being suspended from the ceiling rail 7.

Note that the travelling direction of the stacker crane 11 is indicated by an arrow X as the "travelling direction" in the drawings. Further, a horizontal direction orthogonal to the travelling direction is indicated by an arrow Y as a "lateral direction" in the drawings.

Figure 3:
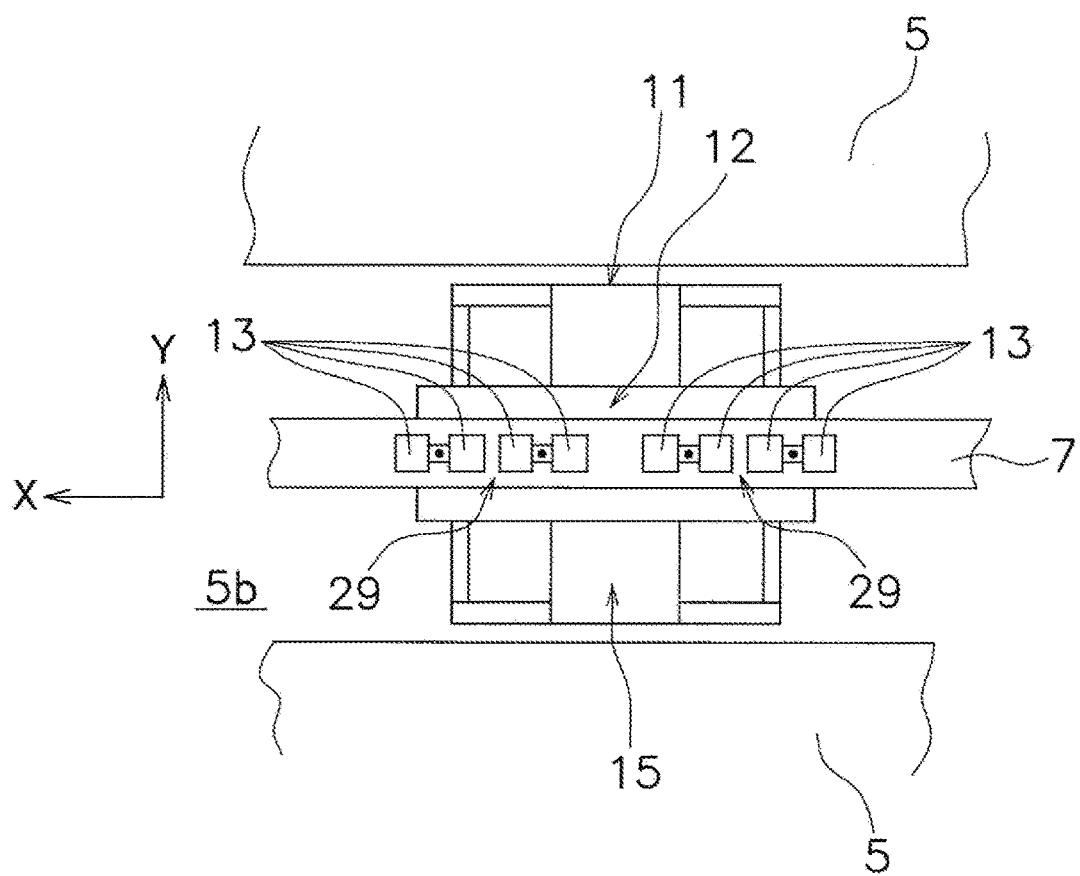
FIG. 3 is a schematic plan view of a stacker crane.

As shown in FIGS. 1 and 3, the stacker crane 11 includes an upper truck frame 12. The upper truck frame 12 is a device that travels along the ceiling rail 7 by generation of driving force. The upper truck frame 12 includes a plurality of driving trucks 13 arranged side by side in the travelling direction. In this preferred embodiment, eight driving trucks 13 are provided. FIG. 3 is a schematic plan view of the stacker crane.

The stacker crane 11 includes a transferring device 15 that is movably suspended with respect to the plurality of driving trucks 13. The transferring device 15 is able to transfer the collection shelf 25 or the pallet P. The transferring device 15 is, for example, a sliding fork device.

Note that as shown in FIG. 2, the stacker crane 11 includes lower truck frames 17. The lower truck frames 17 are guided along the lower guide rail 9.

Figure 4:
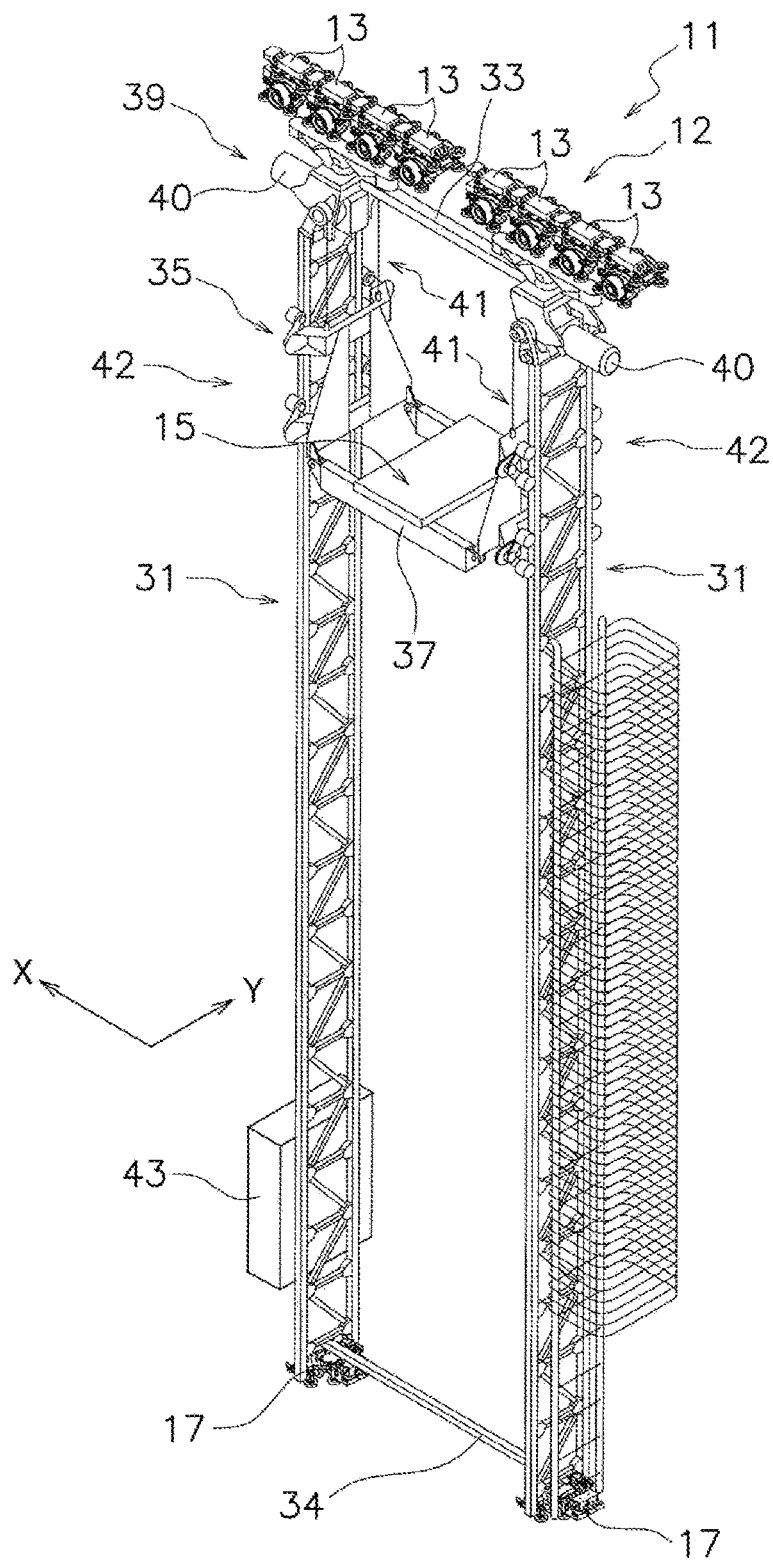
FIG. 4 is a perspective view of the stacker crane.
Figure 5:
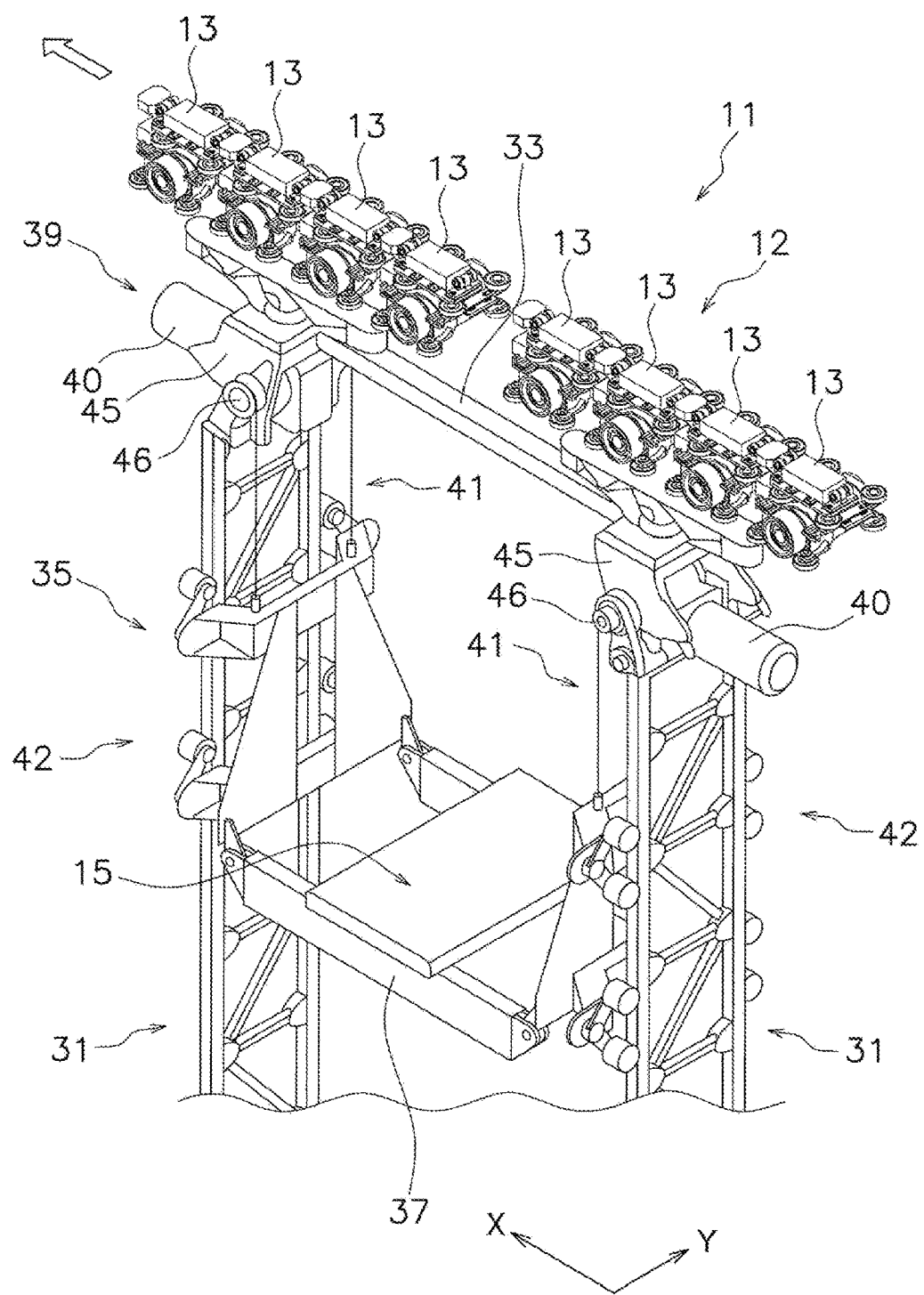
FIG. 5 is a perspective view of an upper portion of the stacker crane.

Referring FIGS. 4 and 5, the stacker crane 11 will be described in detail. FIG. 4 is a perspective view of the stacker crane. FIG. 5 is a perspective view of the upper portion of the stacker crane.

Figure 8:
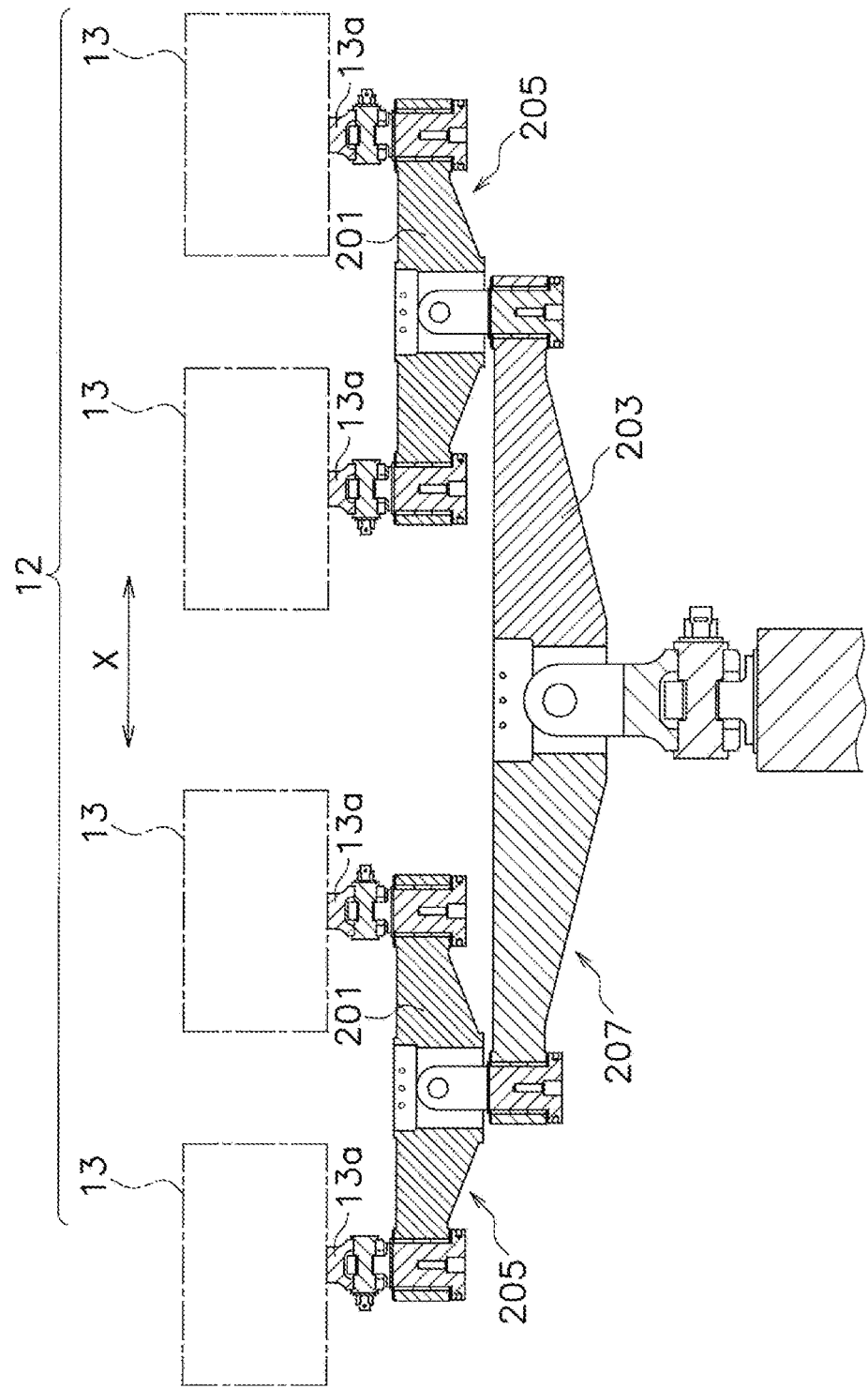
FIG. 8 is a side view showing a connection structure of the upper portion of the stacker crane.

As shown in FIGS. 4 and 5, the eight driving trucks 13 are arranged side by side in the travelling direction. Further, as shown in FIGS. 3 and 8, the driving trucks 13 have a bogie structure 29 (an example of the bogie coupler).

The bogie structure 29 allows the stacker crane 11 to stably travel the curves on the circulating track. A detail of the bogie structure 29 will be described later.

The stacker crane 11 includes a pair of masts 31 arranged in the travelling direction, namely in the longitudinal direction. The pair of masts 31 extends vertically long.

The stacker crane 11 includes an upper base 33 that extends in the travelling direction and links the upper ends of the pair of masts 31. Specifically, a lifting frame 45 (described later) is fixed to the upper end of each of the pair of masts 31, and the upper base 33 links the lifting frames 45.

The stacker crane 11 includes a lower base 34 that extends in the travelling direction and links the lower ends of the pair of masts 31.

Figure 7:
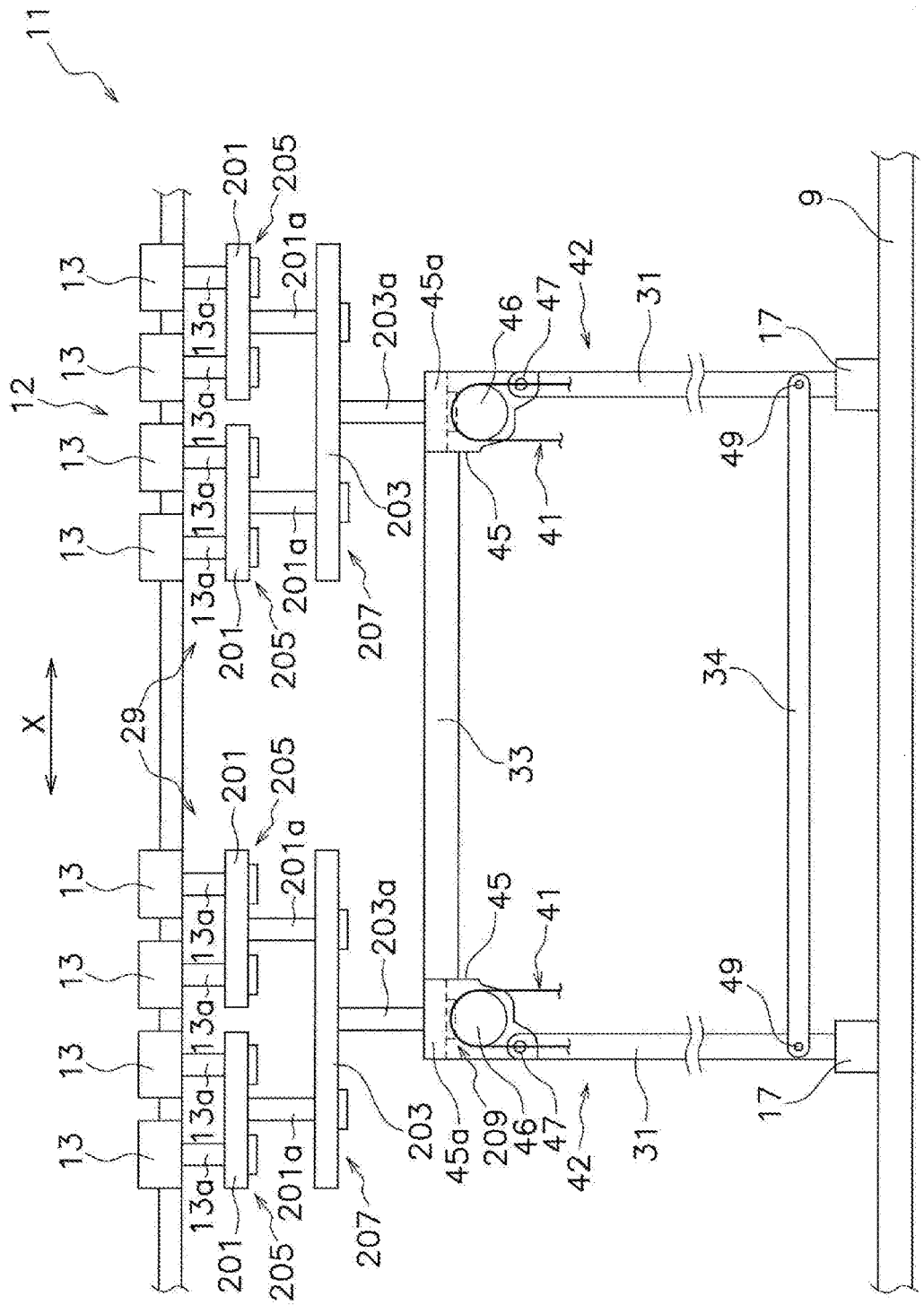
FIG. 7 is a schematic side view showing a schematic configuration of a bogie structure.

As shown in FIG. 7, both upper and lower ends of the pair of masts 31 are supported by other members with pins 47, 49. Specifically, the upper ends of the pair of masts 31 are supported by the lifting frame 45 (described later) with the pins 47. The lower ends of the pair of masts 31 are supported by the lower base 34 with the pins 49. The pins 47, 49 extend laterally, thus making the pair of masts 31 swingable in the travelling direction. With the above-mentioned structure, damping control and body weight reduction are achieved.

The stacker crane 11 includes a lifting device 35 that lifts or lowers the transferring device 15. The lifting device 35 includes a platform 37 supported by the masts 31, and lifting portions 39 that lift or lower the platform 37. The lifting portion 39 is provided in each of the pair of masts 31. The lifting portion 39 is a known device preferably including a lifting drive motor 40, a chain 41, a sprocket 46, and the like.

The lifting portion 39 includes the lifting frame 45. The lifting drive motor 40 and the sprocket 46 are fixed to the lifting frame 45. The lifting frame 45 is linked to the upper end of the mast 31 and is thus a part of the mast 31. Further, as described above, the upper base 33 is fixed to the lifting frame 45.

The transferring device 15 is provided on the platform 37. The transferring device 15 moves an article laterally to transfer the article between shelves.

A lower portion of one of the masts 31 is provided with a control panel 43.

In this preferred embodiment, four driving trucks 13 preferably are arranged for the mast 31 on the front side in the travelling direction, for example. Further, four driving trucks 13 preferably are arranged for the mast 31 on the back side in the travelling direction, for example. In particular, the four driving trucks 13 are arranged such that the center of the driving trucks 13 in the travelling direction corresponds to the center of the sprocket 46. With the above configuration, the driving trucks 13 are able to equally support a load applied from the platform 37 and the masts 31.

Figure 6:
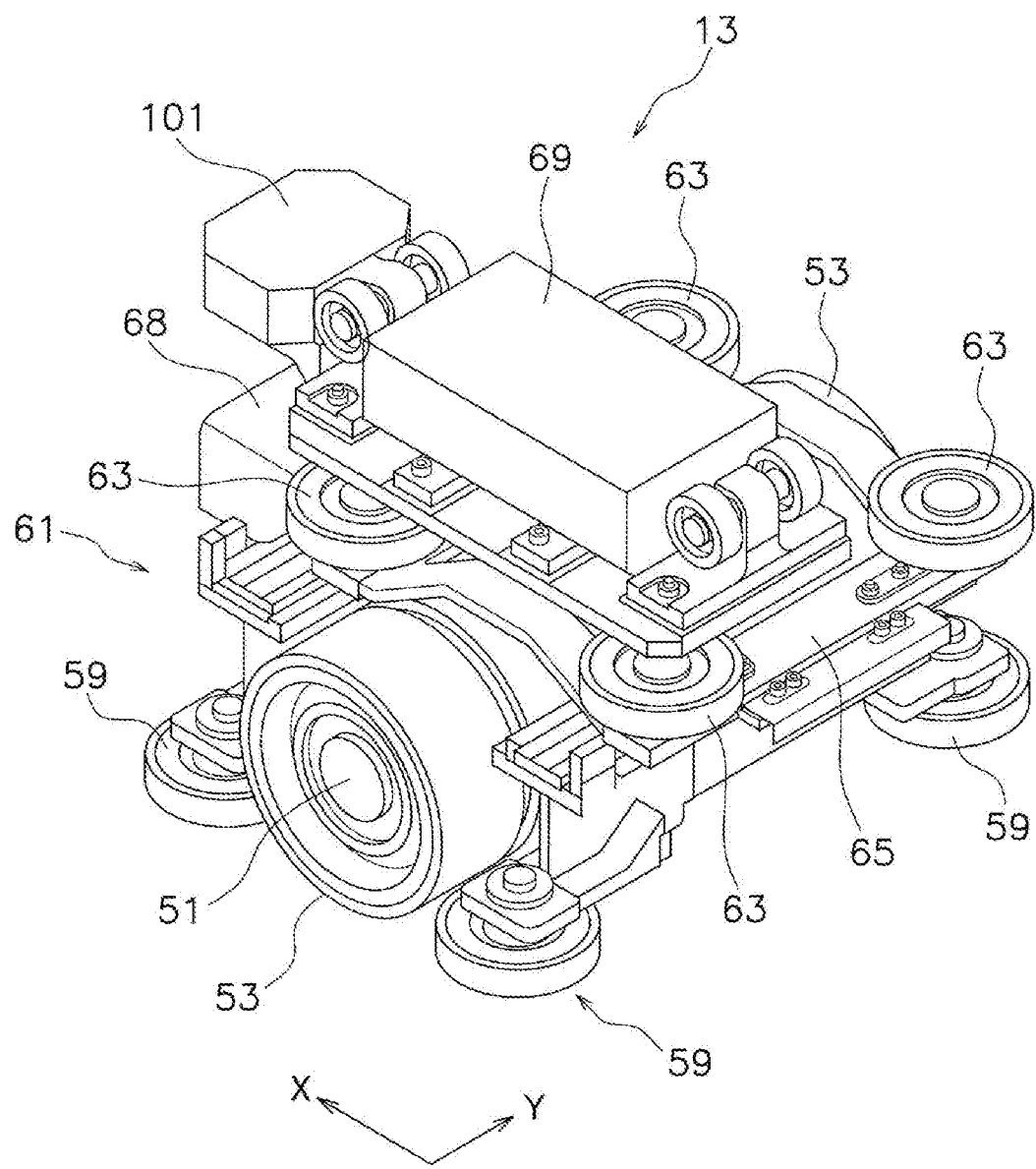
FIG. 6 is a perspective view of a driving truck.

The driving truck 13 will be described with reference to FIG. 6. FIG. 6 is a perspective view of the driving truck.

The driving truck 13 includes an axle shaft 51. The axle shaft 51 extends laterally.

The driving truck 13 includes travelling wheels 53. The travelling wheels 53 are rotatably mounted at both ends of the axle shaft 51. The travelling wheels 53 are placed on the travelling surface of the ceiling rail 7.

The driving truck 13 includes a bracket (not shown). The bracket is disposed and fixed at the center of the axle shaft 51, namely between the travelling wheels 53. Accordingly, the axle shaft 51 is non-rotatably supported by the bracket.

The driving truck 13 includes a linear motor 69. The linear motor 69 includes a coil that faces a permanent magnet (not shown) of a magnet rail provided on the ceiling side. The linear motor 69 is mounted on the bracket.

The driving truck 13 includes a magnetic pole sensor 101. The magnetic pole sensor 101 is a sensor that detects a travelling position of the driving truck 13.

The driving truck 13 includes a side guide roller 59. The side guide roller 59 is guided by the inner surface of the side wall of the ceiling rail 7. The side guide roller 59 is mounted on the bracket. In this preferred embodiment, four side guide rollers 59 preferably are provided in total and arranged side by side in the travelling direction, for example.

The driving truck 13 includes a branch/merge switching device 61. The branch/merge switching device 61 selects a travelling route at a branch/merge switching point on the circulating track. The branch/merge switching device 61 includes a branch switching roller 63. The branch switching roller 63 is guided by the branch guiding surface of the ceiling rail 7. In this preferred embodiment, four branch switching rollers 63 preferably are provided in total and arranged side by side in the travelling direction, for example. The branch switching rollers 63 are disposed above the side guide rollers 59. A lateral distance between the branch switching rollers 63 is shorter than a lateral distance between the side guide rollers 59. The branch switching rollers 63 are linked by the plate 65, and the plate 65 is slidable laterally. The branch/merge switching device 61 includes a motor 68 that generates power to drive sliding of the plate 65.

As described above, each of the driving trucks 13 is provided with the branch switching rollers 63 and the linear motor 69, thus facilitating to deal with an increase and decrease in number of driving trucks 13. Further, with each of the driving trucks 13 separately controllable, it is possible to easily and accurately perform control.

The bogie structure 29 will be described in detail with reference to FIGS. 7 and 8. FIG. 7 is a schematic side view showing a schematic configuration of the bogie structure. FIG. 8 is a side view showing a connection structure of the upper portion of the stacker crane.

The bogie structure 29 defines a load support of the stacker crane 11, and includes a plurality of levels of bogies. In this preferred embodiment, the bogie structure 29 preferably includes three levels of bogies, for example. That is, two driving trucks 13 preferably are provided in the bogie structure, two of which are further provided in the bogie structure to be a bogie structure of the four driving trucks 13, two of which are then provided in the bogie structure to be a bogie structure of the eight driving trucks, for example. Hereinafter, the bogie structure 29 will be described in detail.

The bogie structure 29 includes a first bogie member 201 where driving truck shafts 13a extending downward from the driving trucks 13 are supported rotatably. The lower end of the driving truck shaft 13a is rotatably supported by the first bogie member 201. This structure supports a load of the first bogie member 201. The first bogie member 201 extends in the travelling direction, and the driving truck shafts 13a are rotatably supported at both ends of the first bogie member 201 in the travelling direction. That is, the first bogie member 201 rotatably supports the pair of driving trucks 13. In this manner, in the stacker crane 11, a first-level bogie structure 205 is achieved with respect to the pair of driving trucks 13, and a total number of first-level bogie structures 205 preferably is four, for example.

The bogie structure 29 includes a second bogie member 203 where first shafts 201a extending downward from the first bogie members 201 are supported rotatably. The lower end of the first shaft 201a is rotatably supported by the second bogie member 203. This structure supports a load of the second bogie member 203. The second bogie member 203 extends in the travelling direction, and the first shafts 201a are rotatably supported at both ends of the second bogie member 203 in the travelling direction. That is, the second bogie member 203 rotatably supports the pair of first bogie members 201.

In this manner, in the stacker crane 11, a second-level bogie structure 207 is achieved with respect to the pair of first bogie members 201, and a total number of second-level bogie structures 207 preferably is two, for example.

Further, in each of the lifting frames 45 fixed to the upper ends of the pair of masts 31, the bogie structure 29 includes a support portion 45a where second shafts 203a extending downward from the second bogie member 203 is supported rotatably. The lower end of the second shaft 203a is rotatably supported by the support portion 45a. This structure supports a load of the support portion 45a. That is, the support portions 45a rotatably support the pair of second bogie members 203. In this manner, in the stacker crane 11, a third-level bogie structure 209 is achieved with respect to the pair of second bogie members 203. Note that the support portion 45a and the second bogie member 203 defines the third-level bogie structure 209.

When the plurality of driving trucks 13 travel the curved portions of the ceiling rail 7 by the bogie structure 29, each of the driving trucks 13 is able to turn in appropriate directions to allow smooth travelling.

Figure 9:
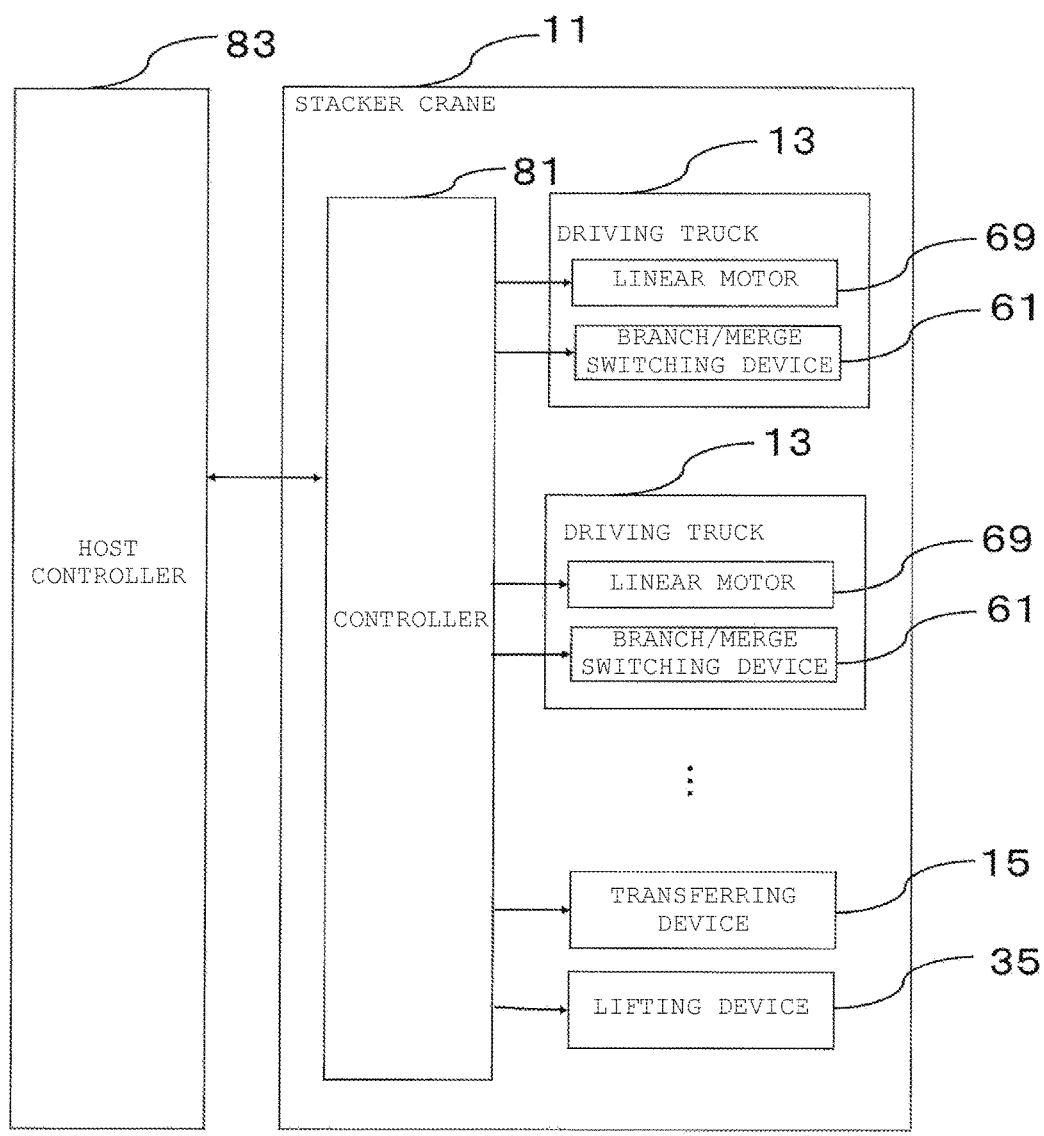
FIG. 9 is a block diagram showing a control configuration of the automated storage.

A control configuration of the automated storage will be described with reference to FIG. 9. FIG. 9 is a block diagram showing a control configuration of the automated storage.

The stacker crane 11 includes a controller 81. The controller 81 preferably includes a computer system including a processor (e.g., a central processing unit (CPU)), a memory (e.g., a read only memory (ROM), a random access memory (RAM), a hard disk drive (HDD), a solid state drive (SSD), etc.), and a variety of interfaces (e.g., an analog-to-digital converter (A/D converter), a D/A converter, a communication interface, etc.). The controller 81 executes a program saved in a memory (corresponding to some or all of the memory), to perform a variety of control operations.

The controller 81 may be a single processor, or may include a plurality of processors which are each independent to perform each control.

Some or all of the function of each element in the controller 81 may be achieved as an executable program in a computer system included in the controller 81. Other than the above, a portion of the function of each element in the controller 81 may include a custom integrated circuit (IC).

Although not shown, the controller 81 is connected with a sensor to detect a size, a shape, and a position of an article, a sensor that detects a state of each device in the stacker crane 11, a switch, and an information input device.

The controller 81 controls operation of each driving truck 13 in the stacker crane 11. The controller 81 is connected with the linear motor 69 and the branch/merge switching device 61 of each driving truck 13. The controller 81 is further connected with the transferring device 15 and the lifting device 35. The controller 81 transmits a driving signal to those connected devices.

Note that the sensor that detects information concerning a travelling state is provided in each driving truck 13. As described above, the controller 81 controls appropriate timing and capacities in terms of travelling drive, branch switching, and the like on the basis of individual positions of the driving trucks 13.

The controller 81 is capable of communication with a host controller 83. The host controller 83 preferably is a computer including a CPU, a RAM, a ROM, and the like, and executes a program. The host controller 83 controls the entire automated storage 1. Specifically, the host controller 83 controls transfer and transport of the container 23 and the collection shelf 25 by the stacker crane 11, and assortment of shipping items by these transfer and transport. The host controller 83 manages the stacker cranes 11 and allocates a travelling command or a transport command thereto. Note that the "transport command" includes a travelling command, and a transfer command including an article loading position and an article unloading position.

As described above, each mast 31 is mounted with the lifting drive motor 40 and the sprocket 46, to define a mast unit 42 as a whole. The "unit" here means a unit which is mounted with required structural elements and is able to be assembled and removed altogether as one integral unit. The pair of mast units 42 is linked to each other by the upper base 33 and the lower base 34.

Thus, just replacing the upper base 33 and the lower base 34 changes a span between the pair of mast units 42 in the traveling direction. That is, the replacement changes a size of the stacker crane 11. In this manner, by utilizing a pair of mast units 42 as a common structure, it is possible to reduce cost even when the configuration of the stacker crane is changed in accordance with an article.

Second Preferred Embodiment

Figure 10:
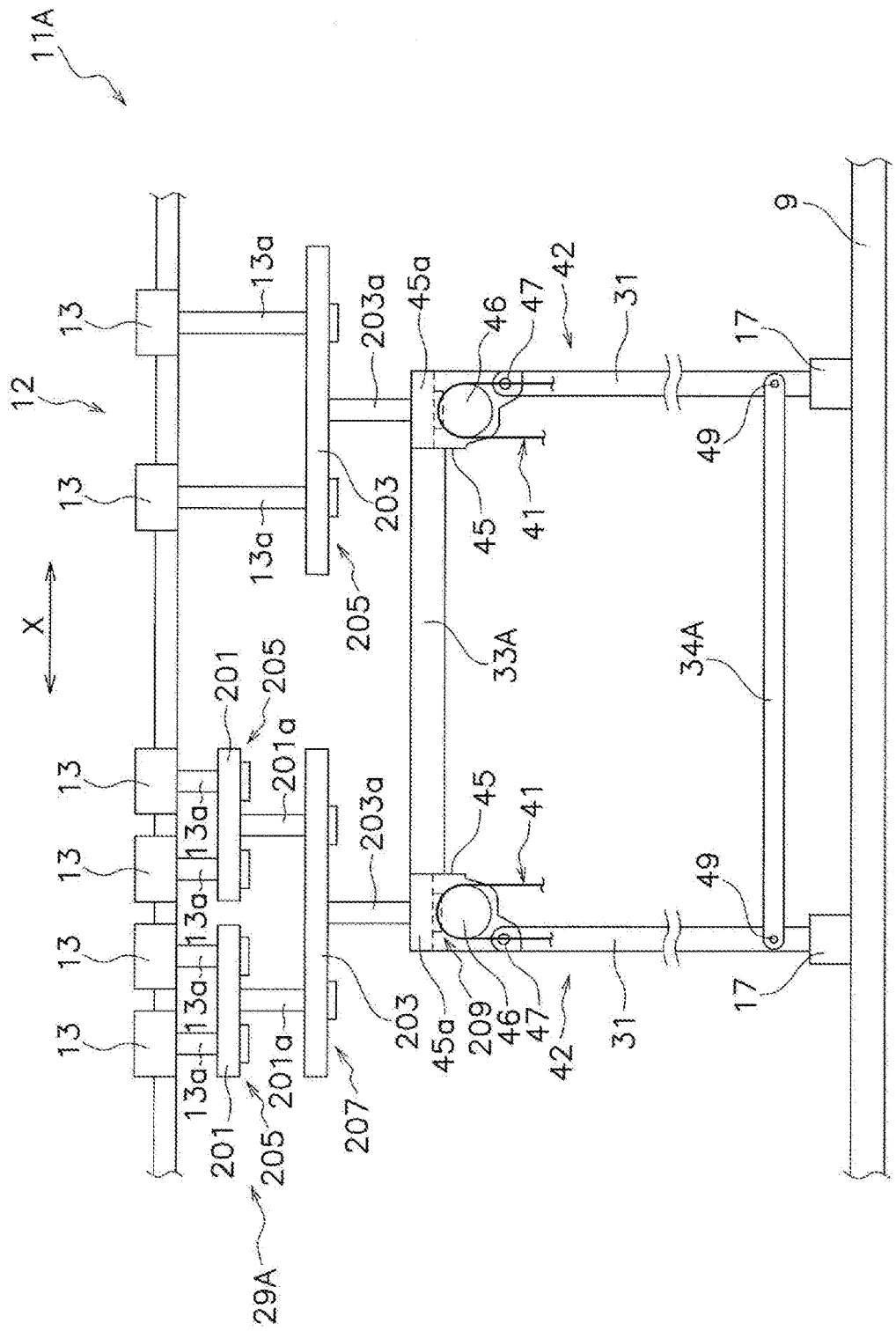
FIG. 10 is a schematic side view showing a schematic configuration of a bogie structure of a second preferred embodiment of the present invention.

With reference to FIG. 10, a description will be given of a preferred embodiment of the present invention where the upper base and the lower base are replaced. FIG. 10 is a schematic side view showing a schematic configuration of a bogie structure of the second preferred embodiment.

In a stacker crane 11A of this preferred embodiment, the number of driving trucks 13 is preferably reduced from eight to six, for example. Accordingly, the upper base and the lower base are changed. Further, the bogie structure is changed. A specific description will be given below.

This preferred embodiment includes an upper base 33A and a lower base 34A which are shorter than those in the first preferred embodiment.

As described above, in the first preferred embodiment, the bogie structure 29 (an example of the bogie coupler) includes the pair of first bogie members 201 (an example of the first bogies) that are arranged side by side in front and back positions in the travelling direction, while coupling two driving trucks 13 that are front and back driving trucks, and the second bogie member 203 (an example of the second bogie) that couples the pair of first bogies 201. Then, as shown in FIG. 8, the first-level bogie structure 205 (an example of the pivotal support structure) of the first bogie member 201 which pivotally supports the driving trucks 13 is the same as the second-level bogie structure 207 (an example of the pivotal support structure) of the second bogie member 203 which pivotally supports the first bogie members 201.

Hence, in this stacker crane, arranging the driving trucks 13 in the second-level bogie structure 207 of the second bogie member 203 facilitates a reduction in number of driving trucks 13.

In FIG. 10, a bogie structure 29A preferably includes three sets of first-level bogie structures 205 that are arranged side by side in front, middle, and back positions in the travelling direction, while coupling two driving trucks 13 arranged side by side in front and back positions in the travelling direction. The bogie structure 29A includes the second-level bogie structure 207 that couples two sets of first-level bogie structures 205 out of the three sets of first-level bogie structures 205. The bogie structure 29A includes the third-level bogie structure 209 that couples the second-level bogie structure 207 and the remaining one set of first-level bogie structure 205 out of the three sets of first-level bogie structures 205. Note that the remaining one set of first-level bogie structure 205 out of the three sets of first-level bogie structures 205 preferably includes the second bogie member 203 which has the same structure as the second-level bogie structure 207.

Consequently, the number of driving trucks 13 in the stacker crane 11A preferably is six, for example. In practice, however, to adjust the height, a member for height adjustment is mounted on one or both of the driving truck 13 and the second bogie member 203, or a higher driving truck 13 may be prepared.

The stacker crane 11 of the first preferred embodiment and the stacker crane 11A of the second preferred embodiment achieve handling of articles with different weights by making the number of driving trucks different. That is, by using the structures where the same type of driving trucks are used and the number thereof are made different, two types of stacker cranes, mountable with articles with different weights, are able to travel on the same track. This results in achievement of the automated storage 1 at low cost. This effect also applies to the following preferred embodiment.

As an example, since 2000 kgf is suspendable from two driving trucks, a total of 8000 kgf is suspendable when the number of driving trucks 13 is eight, and a total of 4000 kgf being a body load and an article load is suspendable when the number of driving trucks 13 is four.

As described above, by unitization of the mast 31 into the mast unit 42, the mast span is able to be changed just by changing the lengths of the upper base and the lower base. This facilitates dealing with an increase and decrease in number of driving trucks 13.

Third Preferred Embodiment

With reference to FIG. 11, a description will be given of a preferred embodiment where the upper base and the lower base are replaced. FIG. 11 is a schematic side view showing a schematic configuration of a bogie structure of the third preferred embodiment.

In a stacker crane 11B of this preferred embodiment, the number of driving trucks 13 is preferably reduced from eight to four, for example. Accordingly, the upper base and the lower base are changed. Further, the bogie structure is changed. A specific description will be given below.

The stacker crane 11B of this preferred embodiment preferably includes an upper base 33B and a lower base 34B which are shorter than those in the second preferred embodiment.

Further, in a bogie structure 29B of this preferred embodiment, in place of the second bogie member 203 of the first preferred embodiment, the first bogie member 201 is coupled to the support portion 45a. That is, the pair of first bogie members 201 is coupled to the pair of front and back masts 31 in the travelling direction. Consequently, the number of driving trucks 13 in the stacker crane 11B preferably is four, for example.

The above change is able to be made because the second-level bogie structure 207 is the same as the third-level bogie structure 209. As thus described, the bogie structural elements are standardized, to thus facilitate replacement of the bogie. In practice, however, to adjust the height, a member for height adjustment is mounted on one or both of the first bogie member 201 and the support portion 45a, or a higher first bogie member 201 is prepared. As still another method, a higher mast unit 42 is prepared.

As described above, by unitization of the mast 31 in the mast unit 42, the mast span is able to be changed just by changing the lengths of the upper base and the lower base. This facilitates dealing with an increase and decrease in number of driving trucks 13.

The suspension stacker crane 11 (an example of the suspension stacker crane) includes the upper truck frame 12 (an example of the travelling truck), the pair of mast units 42 (an example of the pair of mast units), the transferring device 15 (an example of the transferring device), and the upper base 33 (an example of the link).

The upper truck frame 12 includes a plurality of driving trucks 13 (an example of the driving truck) arranged side by side in a travelling direction, and a bogie structure 29 (an example of the bogie coupler) that couples the plurality of driving trucks 13

Each of the mast units 42 is suspended from the bogie structure 29, and includes the lifting drive motor 40 (an example of the lifting drive motor) and the sprocket 46 (an example of the lifting drive transmission). The pair of mast units 42 is arranged side by side in the travelling direction.

The transferring device 15 is driven to be lifted or lowered by the lifting drive motor 40 and the sprocket 46.

The upper base 33 links the pair of mast units 42.

With the above structure, just replacing the upper base changes a span between the pair of mast units 42 in the travelling direction, namely changes the size of the stacker crane 11. In this manner, by utilizing a pair of mast units 42 as a common structure, it is possible to reduce cost even when the configuration of the stacker crane 11 is changed in accordance with an article.

Other Preferred Embodiments

Although the plurality of preferred embodiments of the present invention have been described above, the present invention is not restricted to the above preferred embodiments, and a variety of changes can be made in a range not deviating from the gist of the present invention. In particular, the plurality of preferred embodiments and alternative preferred embodiments described in the present specification are able to be combined arbitrary as required.

For the automated storage, stacker cranes of the same type with the same number of driving trucks may be used, or stacker cranes of a plurality of types with different numbers of driving trucks may be used.

Although the driving source of the driving truck preferably is a linear motor in the above preferred embodiments, the driving source may be a combination of another motor and a driving mechanism.

Preferred embodiments of the present invention are broadly applicable to a suspension stacker crane including a transferring device movably suspended from driving trucks.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A suspension stacker crane comprising:
   a truck frame that includes a plurality of driving trucks arranged side by side in a travelling direction, and a bogie coupler that couples the plurality of driving trucks;
   a pair of mast units that are each suspended from the bogie coupler, each of the pair of mast units including a lifting drive motor and a lifting drive transmission, and the pair of mast units are arranged side by side in the travelling direction;
   a transferring device that is driven to be lifted or lowered by the lifting drive motor and the lifting drive transmission; and
   a link that links the pair of mast units; wherein
   the bogie coupler includes a pair of first bogies that are arranged side by side in front and back positions in the travelling direction, each of the first bogies included in the pair of first bogies couple two of the plurality of driving trucks that are front and back driving trucks;
   the bogie coupler includes a second bogie that couples the pair of first bogies; and
   a pivotal support structure that is included in the pair of first bogies and pivotally supports one of the plurality of driving trucks around a vertical axis; and
   a pivotal support structure that is included in the second bogie pivotally supports one of the first bogies included in the pair of first bogies.

2. The suspension stacker crane according to claim 1, wherein one of the pair of mast units includes a mast and a control panel mounted on the mast.

3. The suspension stacker crane according to claim 1, wherein
   the bogie coupler includes three first bogies that are arranged side by side in front, middle, and back positions in the travelling direction, each of the three first bogies couple two of the plurality of driving trucks arranged side by side in front and back positions in the travelling direction;
   the second bogie couples two out of the three first bogies; and
   the bogie coupler includes a third bogie that couples the second bogie and the remaining one first bogie out of the three first bogies.

* * * * *